Sept. 29, 1931.  J. W. SNIDER  1,825,428
TOMATO PEELING MACHINE
Filed March 19, 1930
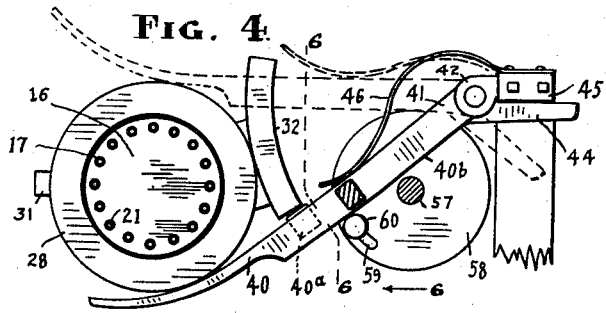
JOHN WALTER SNIDER Patented Sept. 29, 1931

1,825,428

UNITED STATES PATENT OFFICE

JOHN WALTER SNIDER, OF FRANKLIN, INDIANA

TOMATO PEELING MACHINE

Application filed March 19, 1930. Serial No. 437,162.

This invention relates to improvements in machines for removing the skins of fruits and vegetables preparatory to canning them, and it has especial reference to machines for the stripping or peeling of tomatoes.

Advantages desired are that the peelings may be expeditiously removed and that the flesh or stock may be practicably handled without injury.

The objects of my invention are accomplished by, and the invention is embodied in the new construction, combination and arrangement of parts described in the following specification and illustrated in the accompanying drawings.

The several parts of the invention are identified by suitable characters of reference applied to them in the different views of the drawings in which—

Figure 1 is a front view of my improved tomato peeling machine.

Figure 2 is a cross section view taken on the line 2—2, and as seen in the direction of arrow 2 in Figure 1.

Figure 3 is a sectional top plan view taken on the line 3—3 in Figure 1.

Figure 4 is an enlarged top plan view of the structural details shown in Figure 3.

Figure 5 is an enlarged vertical central cross section view taken on line 5—5 and as seen in the direction of arrow 2 in Figure 1.

Figure 6 is a vertical cross section view taken on the line 6—6, in the direction indicated by the arrow 6 in Figure 4.

Figure 7 is an enlarged front view of the receptacle and its connected parts as shown in Figure 1.

My invention, broadly stated consists of a bolster, a cage mounted for reciprocative movement and which is operable to projected position to surround the bolster, and to retracted position to clear the bolster, an apertured receptacle which surrounds and is carried by said cage, means to urge the cage to the projected position, a presser member in position spaced from the cage and operable to and from engagement with the bolster, and during its stroke toward the bolster, to move the cage to retracted position, means operable to detain the cage at retracted position, and means to sweep the surface of the bolster.

By the above combination and arrangement of parts coordinated in the manner as hereinafter described, the tomatoes delivered into the cage are pressed and their skins are severed. The body stock passes through the sides of the cage and into the apertured receptacle and from which said receptacle it is discharged, and the skins, which will have remained within the cage and upon the surface of the bolster, are swept from the bolster and clear of the receptacle by the sweeper member.

A machine of desirable general construction, and in which my invention is embodied, consists of the spaced frame uprights 1 and 2, cross pieces 3, 4, 5, 6 and 7, legs 8 and 9, and bench 10, suitably stayed and secured. On the uprights 1 and 2 are mounted suitable pillow blocks 11, in which a driving shaft 12 is journaled.

The press stand, upon which the tomatoes to be pressed are supported, and which stand is hereinafter designated as the bolster, consists of a column 14 whose base 15 is secured to the bench 10 and to whose top is secured a member which may be designated as a bolster plate 16. This plate, preferably of circular formation, is about six inches in diameter. In the peripheral portion thereof are holes 17 which are spaced in relatively close order as shown in Figure 4.

The cage consists of a circular frame member 19, the neck portion 20 of which has a bore of diameter to fit slidingly on the said column 14. At the peripheral portion of said member 19, vertically disposed tines 21 are securely retained and are spaced to register with the holes 17 in the bolster plate. A coil spring 22 disposed on the column 14 and having its lower end to rest on the base 15 thereof, has its upper end to bear against the neck portion 20 of the cage frame. Thus the cage is urged upwardly, and it is retained at the raised position, its frame member 19 being abutted against the underside 16a of the bolster plate. The tines are of such length that the distance from the surface of the bolster plate to the plane of their tops is about two and one half inches. The cage thus constituted is strong and durable, and is adapted to cointain a quota of tomatoes deposited therein. The tines, while suitably retaining the tomatoes for the purpose of the pressing operation presently to be referred to, facilitate the bursting of the skins. Also there is provided the free egress of the flesh or stock. The said cage is held against rotative movement by means of a key 20a which slidingly occupies a way therefor in the said column 14.

A receptacle adapted to surround and into which is received the material passing from the cage structure just described, consists of a bottom plate 24 inclined as shown in Figures 5 and 6 and which has a central integral shoulder 25 disposed on and secured by suitable means (such as the set screw 26) to the neck 20 of the cage frame. The sheet metal wall plate 27 has its lower edge secured to the peripheral edge of the plate 24, and its upper edge is turned inwardly and constitutes an inturned annular flange 28, the plane of whose top surface is above the plane of the top of the tines. The interior diameter of said flange 28 is such as to suitably clear the bloster plate 16 when the cage and its receptacle are moved to lowered position. At the lower side of the receptacle wall an aperture 30 provides a discharge outlet. Projecting from one side of the said receptacle is a stud 31, and secured to the opposite side thereof is a ledge 32. The functions performed by these parts will presently be described.

Retained slidingly in a guideway frame member 33, is a rod 35 upon whose lower end is a presser head 34, and whose upper end is provided with a suitable cross head 35a. Connecting rod 36 has one end journaled on the cross head 35a, and its other end is journaled on a crank 37 of the driving shaft 12. When at the limit of its upper stroke, the presser head 34 is at position spaced from the cage such suitable distance, that the tomatoes released to the chute 38 may fall directly into the cage. The bottom of the said presser head is preferably provided with a facing 34b of semi-rigid material such as fiber or rubber.

The presser head during its movement downwardly presses the tomatoes and also moves the cage to its completely lowered position as shown by the dotted lines in Figure 1 and in Figure 7. In this lowered position of the cage the plane of the top of the flange 28 is slightly above, and the plane of the tops of the tines is coincident with that of the top of the bolster plate.

Located adjacent to the receptacle and at the height shown in Figure 1, is a sweeper member consisting of a bar 40 whose shoulder portion 41 is journaled on stud pins of suitable frame brackets 42 and 43. The said sweeper bar, as shown in the plan view of Figure 4, is held in the normally retracted position clear of the receptacle (wrist arm 44 being abutted against a suitable stop lug 45) by a spring 46 which is fixed to frame member 5. On the underside of said sweeper bar is an antifriction roller 40a, which is adapted to roll freely on the ledge 32, as will presently be referred to. The function of this sweeper bar 40 is to sweep the surface of the bolster plate at a moment immediately following the completion of the pressing operation. It will be observed that the plane of the top 28 of the receptacle (at the moment of the completion of the downward stroke of the presser member) is slightly above the plane of the bolster. To depress the said receptacle so that the plane of its top surface will be below the plane of the bolster, and then to hold the said receptacle for a moment against upward movement is the function of the device described as follows.

A keeper bar 47, supported pivotally on the cross pin 48 of a pillow block 49 which is secured to frame member 7, has its portion 47a of beveled formation, as shown in Figure 7. The height at which this keeper bar is supported, with relation to the height of the receptacle, is as shown in Figure 7. A coil spring 47b, one end of which is engaged with the lower portion of the keeper bar and whose other end is secured to the block 49, holds the keeper bar at an inclined position, (as shown in Figure 7) the degree of which inclination is limited by a lug 50. On the lower portion of the keeper bar, a dog 51 is retained at raised position, abutted against a lug 47c on said bar, by a coil spring 52. The function of the bearing face 51a of said dog will be presently referred to.

Journaled in brackets 55 and 56 of the machine frame is a shaft 57 upon which is secured a face wheel 58. In an arcuate slot 59 provided in said face wheel, is adjustably secured a pawl 60 whose function, as the wheel 58 is rotated, is to actuate the sweeper bar. A bevel gearing 61 between the shaft 12 and the shaft 57, serves to move the latter at such speed, that for each stroke of the presser member there is a sweep of the sweeper member.

In a trough 65 of suitable width and depth which is supported on the bench 10 and in proper relation to the receptacle, the stock which is being discharged through the aperture 30 of the receptacle may be received. Obviously the stock may be received from the receptacle in containers handled manually, or by such mechanical means as may be desired. At the opposite side of the bench is disposed a trough 66 which is adapted to receive the skins swept clear of the receptacle by the sweeper bar 40. The invention, being available in unit structure formation, lends itself readily for requirements of wide range. Additional units of the general construction and arrangement shown, may be arranged in alignment with and operable from, the driving shaft 12 which may be accordingly extended. A non corrosive metal is preferred for the tines, the bolster plate, and the receptacle. A typical form of embodiment of my invention is that shown in Figure 1.

The relative positions occupied by the several parts, in readiness for operation, are as shown in Figure 1. With the rotation of the driving shaft 12, there is the reciprocative movement of the presser member. The scalded tomatoes, two or three at a time, released into the chute 38 by the operative, pass into the cage as the presser head rises. As the presser head descends the tomatoes are pressed, the skins thereof becoming split and severed. The presser head constitutes a closure of the opening in the top plate 28 of the receptacle. This top plate being at a plane above the plane of the top of the tines, there is avoided the egress thereat of the tomato content passed from the cage. With the completion of the stroke of the presser head all of the pulp or body stock of the tomatoes will have been passed between the tines of the cage and into the receptacle. During this downward travel of the presser head, the arm 34c thereon will have impinged against the head portion 47a, and the face 47d of the keeper bar 47, thereby moving the latter to, and retaining it (against the tension of the spring 47b) in the dotted line position shown in Figure 7. The lug 31 of the receptacle will have passed the dog 51, and the latter will have (by the tension of spring 52) reassumed its normal position shown, and coincidently with the arrival of the presser member at the limit of its downward movement, the bearing face 51a of said dog will have lowered the receptacle from the plane indicated by the dotted line A to the plane indicated by the dotted line B.

When the receptacle is so lowered to the plane B the plane of the surface of ledge 32 is coincident with the plane of the face of the roller 40a. As the presser head rises, the arm 34c prevents the keeper bar 47 from change of position, the pressure by the dog 51 against the lug 31 being continued, the receptacle being thereby detained a moment at the lowered plane B. The position of the pawl 60 on the face wheel 58 is such that, at the moment above named, the sweeper bar 40 is actuated, and as the said sweeper bar moves, the roller 40a rides along the ledge 32. As the presser head continues upwardly and the arm 34c clears the keeper bar 47 the latter returns to its normal position, clearing the way for the lug 31.

By the pawl 60 bearing against the face 40b of the sweeper bar, the latter is actuated. Upward movement of the receptacle (by the urge of spring 14) is resisted by the roller 40a bearing against the ledge 32. In the travel of the sweeper bar to the dotted line position (see Figure 4) the surface of the bolster plate 16 will have been traversed, and the skins will have been swept therefrom and across the top plate 28 of the receptacle, whence they drop into the trough 66. As the pawl leaves the face 40b of the sweeper bar, the latter, by the action of the leaf spring 46 is returned to its normal position shown in Figure 4. The roller having become disengaged from the ledge 32, and the urge of the spring 14 being now unresisted, the cage is raised to its normal position. The foregoing functions will have been performed quickly and during the interval of time in which the presser head will have been returned to the raised position, the several parts being again in the relative positions as shown in Figure 1.

A machine constructed in accordance with my invention is capable of being manufactured economically, and is adaptable and adjustable for variable requirements. In operating the machine there is no handling or touching manually of the tomatoes from the time they are delivered into the chute 38 until the stock is taken from the receptacle. There is no waste of the flesh, nor is there any waste of the juices of the tomatoes, and the stock as it is received from the receptacle is clean and wholesome.

It will be understood that means for receiving the stock for transport from the aperture 30 of the receptacle may be such as are incident to the user's requirements. With a machine of the construction described, having a cage six inches in diameter (accommodating three tomatoes of average size), the capacity, at forty strokes a minute, is about one hundred twenty tomatoes, or three quarters of a bushel.

Whereas, in the process of peeling tomatoes manually, about thirty pounds of stock from sixty pounds of whole tomatoes are realized, I am enabled, by the use of my invention, to realize about fifty pounds of stock out of sixty pounds of whole tomatoes. Emphasizing the importance of the above accomplishment is the further fact that, after taking the juice from the fifty pounds of prime stock, there is left a canning stock of thirty-two pounds.

Further advantages afforded by my invention are that all of the parts are capable of being thoroughly cleansed and sanitated; there is no waste of the tomato stock in the operation of peeling, and the stock received in and delivered from the receptacle is clear, clean and of uniform quality. The machine is simple of construction and consists of relatively few parts and is not liable to get out of order or repair.

I am aware that minor changes may be made in the structural features and details of the machine embodying my invention, without departing from the spirit of the invention or sacrificing any of its advantages.

What I claim as my invention and desire to secure by Letters Patent is—

1. A machine of the kind described, comprising a bolster, a cage mounted for and which is operable to projected position to surround the bolster, and to retracted position to clear the bolster, means to urge the cage to projected position, a presser member spaced from the cage and operable to and from engagement with the bolster, and during its stroke toward the bolster, to move the cage to retracted position, means operable to detain the cage at retracted position, and means to sweep the bolster.

2. A machine of the kind described, comprising a bolster, a cage mounted for and which is operable to projected position to surround the bolster, and to retracted position to clear the bolster, an apertured receptacle to surround and which is carried by the cage, means to urge the cage to projected position, a presser member spaced from the cage and operable to and from the engagement with the bolster, and during its stroke toward the bolster, to move the cage to retracted position, means operable to detain the cage at retracted position and means to sweep the bolster.

3. A machine of the kind described, comprising a frame, a driving shaft journaled thereon, a press stand, a bolster plate thereon, a cage supported by the press stand and which is operable to raised position to surround the bolster plate, and to lowered position to clear the bolster plate, a receptacle to surround and which is carried by the cage, a spring on the press stand to urge the cage to, and retain it at raised position, a presser member mounted above the cage for reciprocative movement, and operable on its downward stroke to close the top of the receptacle, and to move the cage to the lowered position, power transmitting connections between the driving shaft and said presser member, a device operable to detain the cage at the lowered position, a device to sweep the bolster, power transmitting connections between the driving shaft and the said devices to actuate the latter.

4. A machine of the kind described, comprising a frame, a driving shaft journaled thereon, a press stand, a bolster plate thereon, a cage structure retained slidingly on the press stand and which is operable to raised and lowered positions, the said structure embodying longitudinal spaced tines passed through guideways therefor in the peripheral portion of the bolster plate, and a receptacle to surround and which is carried by the cage, a spring on the press stand to urge the cage to and retain it at raised position, a presser member mounted above the cage for reciprocative movement, and operable on its downward stroke to move the cage to the lowered position, power transmitting connections between the driving shaft and said presser member, devices operable to detain the cage at the lowered position, a device to sweep the bolster, power transmitting connections between the presser member and the detaining device, and power transmitting devices between the driving shaft and the sweeper device.

5. A machine of the kind described, comprising a bolster, a cage mounted for and which is operable reciprocatively of the bolster, and which is provided with tines passed through guideways in the bolster, means to maintain the cage normally in position with its tines projected through the bolster, a presser member spaced from the cage and operable to and from engagement with the bolster, and during its stroke toward the bolster, to move the cage to retracted position, means operable to detain the cage at retracted position and means to sweep the bolster.

6. A machine of the kind described, comprising a bolster, a cage mounted for and which is operable reciprocatively of the bolster, and which is provided with tines passed through guideways in the bolster, a receptacle to surround the cage and which is carried by the said cage, means to maintain the cage normally in position with its tines projected through the bolster, a presser member spaced from the cage and operable to and from engagement with the bolster, and during its stroke toward the bolster, to move the cage to retracted position, means operable to detain the cage at retracted position and means to sweep the bolster.

JOHN WALTER SNIDER.